United States Patent
Kubozono

(10) Patent No.: US 10,704,930 B2
(45) Date of Patent: Jul. 7, 2020

(54) ELECTROMAGNETIC INDUCTION TYPE DISPLACEMENT DETECTION APPARATUS AND MEASURING INSTRUMENT USING THE SAME

(71) Applicant: Mitutoyo Corporation, Kawasaki, Kanagawa (JP)

(72) Inventor: Hiroto Kubozono, Kanagawa (JP)

(73) Assignee: MITUTOYO, Kawasaki (JP)

( * ) Notice: Subject to any disclaimer, the term of this patent is extended or adjusted under 35 U.S.C. 154(b) by 217 days.

(21) Appl. No.: 15/925,858

(22) Filed: Mar. 20, 2018

(65) Prior Publication Data
US 2018/0274949 A1 Sep. 27, 2018

(30) Foreign Application Priority Data
Mar. 23, 2017 (JP) .................................. 2017-057604

(51) Int. Cl.
*G01D 5/20* (2006.01)
*G01B 7/00* (2006.01)

(52) U.S. Cl.
CPC .......... *G01D 5/2053* (2013.01); *G01B 7/003* (2013.01); *G01D 5/206* (2013.01)

(58) Field of Classification Search
None
See application file for complete search history.

(56) References Cited

U.S. PATENT DOCUMENTS

| 5,804,963 | A | * | 9/1998 | Meyer | G01D 5/202 |
| | | | | | 324/207.17 |
| 5,936,399 | A | * | 8/1999 | Andermo | G01D 5/202 |
| | | | | | 324/207.17 |
| 5,998,990 | A | * | 12/1999 | Andermo | G01D 5/2086 |
| | | | | | 324/207.12 |

(Continued)

FOREIGN PATENT DOCUMENTS

JP 2009-186348 8/2009

*Primary Examiner* — Paresh Patel
(74) *Attorney, Agent, or Firm* — Rankin, Hill & Clark LLP

(57) ABSTRACT

Provided is an electromagnetic induction type displacement detection apparatus in which influence of a change in magnetic flux received by a receiving device can be suppressed. An electromagnetic induction type displacement detection apparatus 1 includes a scale including a scale coil and a head 3 relatively moving with respect to the scale. The head 3 includes a transmitting device 4 that generates magnetic flux in the scale coil, and a receiving device 5 that includes a first receiving unit 51 and a second receiving unit 52 each receiving the change in the magnetic flux and in which the first receiving unit 51 and the second receiving unit 52 are arranged to be shifted from each other along a measurement direction. The receiving device 5 includes one end portion 10a and another end portion 10b in which a density of a plurality of receiving coils 500 is made sparse, and a central portion 11 that is positioned between the one end portion 10a and the other end portion 10b and in which the density of the plurality of receiving coils 500 is made dense. The electromagnetic induction type displacement (Continued)

detection apparatus 1 includes the one end portion 10*a* and the other end portion 10*b* and the central portion 11, whereby influence of the change in the magnetic flux received by the receiving device 5 can be suppressed.

3 Claims, 8 Drawing Sheets

(56) References Cited

U.S. PATENT DOCUMENTS

| | | | |
|---|---|---|---|
| 7,015,687 B2* | 3/2006 | Meyer | G01D 5/2053 324/207.17 |
| 7,652,469 B2* | 1/2010 | Meyer | G01D 5/202 324/207.15 |
| 2008/0018328 A1* | 1/2008 | Meyer | G01D 5/202 324/207.15 |

* cited by examiner

ELECTROMAGNETIC INDUCTION TYPE DISPLACEMENT DETECTION APPARATUS AND MEASURING INSTRUMENT USING THE SAME

CROSS-REFERENCE TO RELATED APPLICATION

This non-provisional application claims priority under 35 U.S.C. § 119(a) from Japanese Patent Application No. 2017-057604, filed on Mar. 23, 2017, the entire contents of which are incorporated herein by reference.

BACKGROUND

Technical Field

The present invention relates to an electromagnetic induction type displacement detection apparatus that uses an induced current to detect an amount of movement between members.

Background Art

Conventionally, an electromagnetic induction type displacement detection apparatus is known that includes a scale including a scale coil, and a head facing the scale and relatively moving along a measurement direction.

The head includes a transmitting device including a transmitting coil that generates magnetic flux in the scale coil, and a receiving device including a receiving coil that receives a change in the magnetic flux from the scale coil.

In such an electromagnetic induction type displacement detection apparatus, for example, an induction type displacement detection apparatus described in JP 2009-186348 A includes a scale having a plurality of magnetic flux coupling members (scale coils) arranged along the measurement direction, and a sensor head (head) facing the scale and relatively moving along the measurement direction. The sensor head includes a transmitting winding (transmitting coil) that supplies the magnetic flux to the plurality of magnetic flux coupling members, and a receiving winding (receiving coil) capable of magnetic flux coupling with the plurality of magnetic flux coupling members.

The receiving winding includes a first wiring layer including a plurality of substantially S-shaped wiring lines arranged along a row direction parallel to the measurement direction, and a second wiring layer including a plurality of substantially inverted S-shaped wiring lines arranged along the row direction similarly to the first wiring layer. In the receiving winding, the first wiring layer and the second wiring layer are layered, whereby a plurality of rectangular windings is formed. The receiving winding includes a winding group including the plurality of windings arranged in the row direction, and two rows of winding groups are arranged along a column direction orthogonal to the row direction in a surface on which the first wiring layer and the second wiring layer are arranged. The receiving winding includes the two rows of the winding groups arranged along the column direction, thereby enhancing receivable signal strength.

SUMMARY OF THE INVENTION

Problems to be Solved by the Invention

However, there are cases where the head is inclined in a roll direction, a pitch direction, and a yaw direction with respect to the scale, which causes a problem that the change in the magnetic flux received by the receiving device is influenced.

Here, the roll direction is a direction in which the head rotates around the row direction, the pitch direction is a direction in which the head rotates around the column direction, and the yaw direction is a direction in which the head rotates around a direction orthogonal to the row direction and the column direction.

For example, when the head rotates in the pitch direction with respect to the scale and one end side along the row direction comes close to the scale, the other end side comes away from the scale. In this case, at one end side of the receiving device, influence of the change in the magnetic flux received increases, and at the other end side of the receiving device, the influence of the change in the magnetic flux received decreases.

On the other hand, for example, when the head rotates in the pitch direction with respect to the scale and the one end side along the row direction comes away from the scale, the other end side comes close to the scale. In this case, at the one end side of the receiving device, the influence of the change in the magnetic flux received decreases, and at the other end side of the receiving device, the influence of the change in the magnetic flux received increases.

An object of the present invention is to provide an electromagnetic induction type displacement detection apparatus in which the influence of the change in the magnetic flux received by the receiving device can be suppressed.

Means for Solving the Problems

An electromagnetic induction type displacement detection apparatus of the present invention includes: a scale including a scale coil; and a head facing the scale and relatively moving along the scale in a measurement direction, in which the head includes: a transmitting device including a transmitting coil that generates magnetic flux in the scale coil; and a receiving device that includes a first receiving unit and a second receiving unit each receiving a change in magnetic flux from the scale coil and in which the first receiving unit and the second receiving unit are arranged to be shifted from each other along the measurement direction, and the first receiving unit and the second receiving unit include a plurality of coil lines arranged in parallel along a column direction, the plurality of coil lines including a plurality of receiving coils arranged along a row direction parallel to the measurement direction, and the receiving device includes: one end portion and another end portion that are positioned at one end side and another end side in the measurement direction respectively and in which a density of the plurality of receiving coils is made sparse; and a central portion that is positioned between the one end portion and the other end portion and in which the density of the plurality of receiving coils is made dense.

Here, a state in which the density of the plurality of receiving coils is made sparse means, for example, a state in which the number of turns of the receiving coils is reduced, a portion that does not function as a receiving coil is provided not to generate the magnetic flux, or an area of the receiving coils is decreased, whereby the apparatus is made less susceptible to the influence of the magnetic flux received by the receiving device. In addition, a state in which the density of the plurality of receiving coils is made dense means, for example, a state in which the number of turns is increased by overlapping the receiving coils, or the area of the receiving coils is increased, whereby the apparatus is made susceptible to the influence of the magnetic flux received by the receiving device.

According to the present invention as described above, even if the head rotates in the pitch direction and comes close to or away from the scale, the change in the magnetic flux generated is smaller in the one end portion and the other end portion in which the density of the plurality of receiving coils is made sparse than in the central portion in which the density of the plurality of receiving coils is made dense, so that it is possible to make the apparatus less susceptible to the influence of the change in the magnetic flux received by the receiving device.

In addition, even if the head rotates in the pitch direction and comes close to or away from the scale, a magnitude of the magnetic flux generated is larger in the central portion in which the density of the plurality of receiving coils is made dense than in the one end portion and the other end portion in which the density of the plurality of receiving coils is made sparse, so that it is possible to make the apparatus susceptible to the influence of the change in the magnetic flux received by the receiving device. As a result, in the electromagnetic induction type displacement detection apparatus, the change in the magnetic flux received by the receiving device can be stabilized.

Therefore, in the electromagnetic induction type displacement detection apparatus, the influence of the change in the magnetic flux received by the receiving device can be suppressed.

In this case, it is preferable that, in the one end portion and the other end portion, the density of the plurality of receiving coils is made sparse by removing some of the receiving coils in at least one coil line out of the plurality of coil lines.

Here, the receiving coils are configured by layering a plurality of wiring layers in which a plurality of wiring lines is formed on a substrate.

For example, by using a method of layering at least three wiring layers, the receiving coils can be made to have the state in which the density of the plurality of receiving coils is made sparse. Specifically, a method can be adopted in which in addition to two wiring layers forming the receiving coils, a new wiring layer is layered including a wiring line for canceling functions of the receiving coils. In this case, there is a problem that the receiving coils have to be configured by layering at least three wiring layers.

In addition, for example, by using the method of layering at least three wiring layers, the receiving coils can be made to have the state in which the density of the plurality of receiving coils is made dense. Specifically, a method can be adopted in which in addition to the two wiring layers forming the receiving coils, a wiring layer is layered including a wiring line for connecting the two wiring layers together to increase the number of turns. In this case, there is a problem that the receiving coils have to be configured by layering at least three wiring layers.

However, according to the present invention, the one end portion and the other end portion are each made to have the state in which the density of the plurality of receiving coils is made sparse, by removing some of the receiving coils in at least one coil line out of the plurality of coil lines. For this reason, without layering the wiring layer for canceling the functions of the receiving coils or the wiring layer for connecting the two wiring layers together to increase the number of turns, the receiving coils can be configured by layering the two wiring layers to have the state in which the density of the plurality of receiving coils is made sparse and the state in which the density is made dense.

In addition, since the receiving coils are formed by layering the two wiring layers, the number of wiring layers used is less than that in a case where the three wiring layers are layered for forming the receiving coil. Therefore, a manufacturing process of the receiving coils is simplified, and cost reduction of the electromagnetic induction type displacement detection apparatus can be achieved.

Here, in a case where a plurality of receiving units, such as the first receiving unit and the second receiving unit, is arranged to be shifted from each other, the receiving coils can be made to have the state in which the density of the plurality of receiving coils is made sparse by using the two wiring layers without using the three wiring layers. Specifically, the plurality of receiving coils that functions effectively is arranged to be away from each other along the measurement direction, and is made to have the state in which the density of the plurality of receiving coils is made sparse. Then, a method can be adopted in which the wiring line is arranged to be extended in a region outside a region where the receiving coils that function effectively are formed, and the plurality of receiving coils arranged to be away from each other is connected together. In this case, since the receiving coils are arranged by extending the wiring line in the outside of the region where the receiving coils that function effectively are formed, there is a problem that a region (area) required for forming the receiving coils increases. In addition, there is a problem that, in the receiving coils, a wiring line that does not function as the receiving coils has to be used to connect together the plurality of receiving coils arranged to be away from each other.

However, according to the present invention, the one end portion and the other end portion are each made to have the state in which the density of the plurality of receiving coils is made sparse, by removing some of the receiving coils. For this reason, the receiving coils can be made to have the state in which the density of the plurality of receiving coils is made sparse, without arranging the wiring line extending in the outside of the region where the receiving coils that function effectively are formed. In addition, in the receiving coils, without using the wiring line that does not function as the receiving coils to connect together the plurality of receiving coils arranged to be away from each other, all wiring lines can be caused to function effectively as the receiving coils. Therefore, in the electromagnetic induction type displacement detection apparatus, efficiency of the receiving coils can be improved.

In this case, it is preferable that the first receiving unit and the second receiving unit include three or more rows of coil lines, and in the one end portion and the other end portion, the density of the plurality of receiving coils is made sparse, by removing some of the receiving coils of each of the coil lines arranged at both sides in the column direction, out of the plurality of coil lines, in an axisymmetric manner with respect to a symmetry axis along the measurement direction.

With this configuration, in the one end portion and the other end portion, out of the plurality of coil lines, some of the receiving coils of each of the coil lines arranged at both sides in the column direction are removed in the axisymmetric manner with respect to the symmetry axis along the measurement direction. As a result, in a case where the head rotates in the roll direction with respect to the scale, in the one end portion and the other end portion, the number of the plurality of receiving coils close to the scale and the number of the receiving coils away from the scale are the same as each other, so that the influence of the change in the magnetic flux can be canceled and decreased.

In this case, it is preferable that, in the one end portion and the other end portion, the density of the plurality of receiving coils is made sparse by removing an identical number of receiving coils.

With this configuration, the plurality of receiving coils of the receiving device is arranged in a substantially hexagonal shape along the measurement direction. Specifically, portions in the state in which the density of the plurality of receiving coils is made dense are arranged in a substantially rectangular shape. Portions in the state in which the density of the plurality of receiving coils is made sparse are arranged in a substantially triangular shape having each side on the one end portion side and the other end portion side of the substantially rectangular shape as the base. As a result, in a case where the head rotates in the yaw direction with respect to the scale, the receiving coils in the one end portion and the other end portion do not easily protrude outside the scale, so that the influence of the change in the magnetic flux can be decreased.

A measuring instrument of the present invention includes an electromagnetic induction type displacement detection apparatus of the present invention, in which a measurement result is output on the basis of an amount of movement between a scale and a head detected by the electromagnetic induction type displacement detection apparatus.

According to the present invention as described above, the measuring instrument includes the electromagnetic induction type displacement detection apparatus according to the present invention, whereby the influence of the change in the magnetic flux received by the receiving device can be suppressed, and stability of the measurement result can be improved.

DETAILED DESCRIPTION OF THE EMBODIMENTS

First Embodiment

Hereinafter, a first embodiment of the present invention will be described with reference to the drawings.

Figure 1:
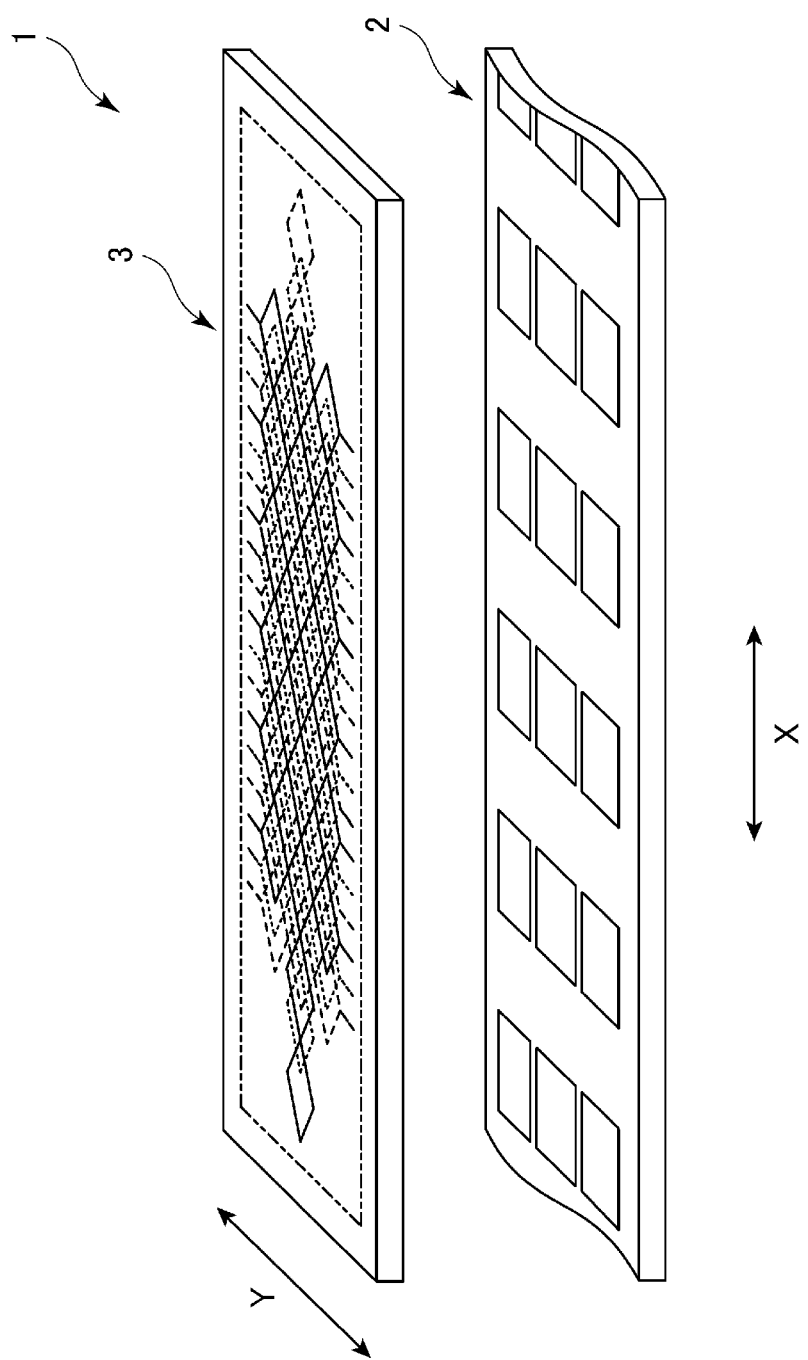
FIG. 1 is a perspective view illustrating an electromagnetic induction type displacement detection apparatus according to a first embodiment of the present invention.

FIG. 1 is a perspective view illustrating an electromagnetic induction type displacement detection apparatus according to the first embodiment of the present invention.

As illustrated in FIG. 1, an electromagnetic induction type displacement detection apparatus 1 includes a scale 2 including a scale coil, and a head 3 facing the scale 2 and relatively moving along a measurement direction, and is used for an electromagnetic induction type caliper as a measuring instrument.

The electromagnetic induction type displacement detection apparatus 1 is provided inside the electromagnetic induction type caliper. In the electromagnetic induction type caliper, the scale 2 and the head 3 are relatively moved along the X direction that is the measurement direction, and an amount of movement between the members is detected based on an induced current by the electromagnetic induction type displacement detection apparatus 1, and a measurement result is output on a display unit (not illustrated) or the like on the basis of the amount of movement detected.

In the following description and drawings, there are cases where a moving direction (measurement direction) of the head 3 that is a longitudinal direction of the scale 2 is referred to as the X direction, and a width direction of the scale 2 orthogonal to the X direction is referred to as the Y direction.

Figure 2:
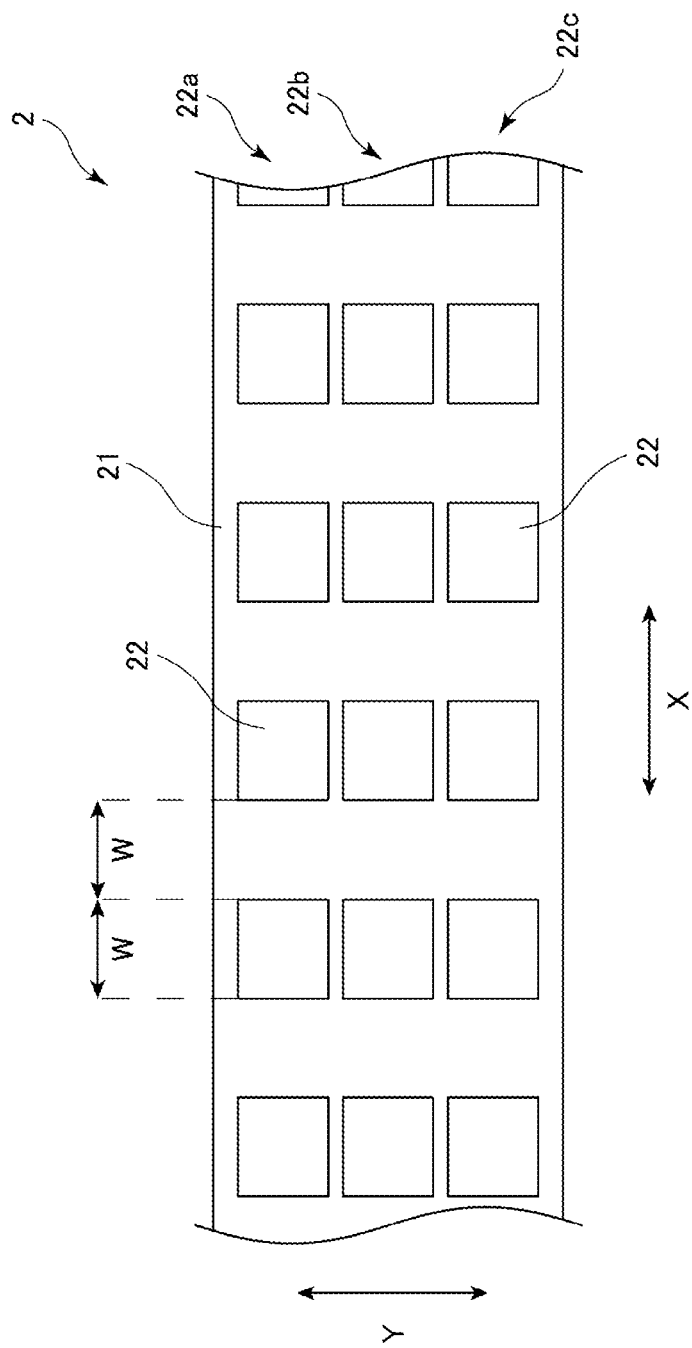
FIG. 2 is a top view illustrating a scale according to the first embodiment of the present invention.

FIG. 2 is a top view illustrating the scale according to the first embodiment of the present invention.

As illustrated in FIG. 2, the scale 2 includes an insulating substrate 21 made of an elongated glass epoxy resin, and a scale coil 22 provided to face the head 3.

The insulating substrate 21 may be made of a material such as glass or silicon rather than glass epoxy resin.

The scale coil 22 is formed of a material having a low electric resistance such as aluminum, copper, or gold, and is configured from a substantially rectangular linear conductor having a width W in the X direction.

The scale coil 22 is provided at the same pitch W as the width W of the scale coil 22 along the X direction on the scale 2, and three rows are provided along the Y direction. That is, the scale coil 22 includes a scale coil 22a of the first row, a scale coil 22b of the second row, and a scale coil 22c of the third row. In addition, the scale coil 22 may be a metal plate or the like periodically arranged, rather than the linear conductor.

Figure 3:
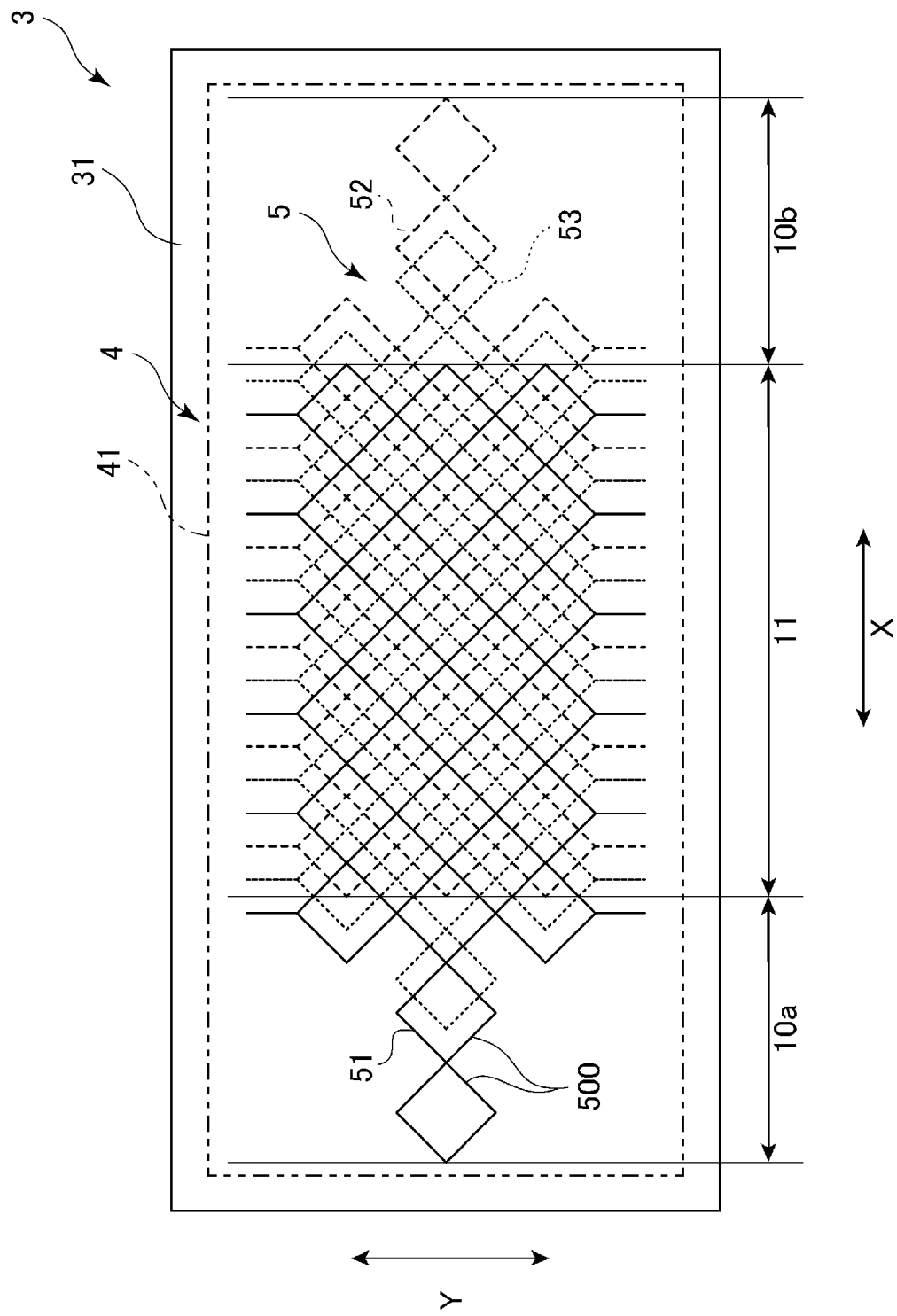
FIG. 3 is a top view illustrating a head according to the first embodiment of the present invention.

FIG. 3 is a top view illustrating the head according to the first embodiment of the present invention.

As illustrated in FIG. 3, the head 3 includes a transmitting device 4 that generates magnetic flux in the scale coil 22 (see FIG. 2), and a receiving device 5 that receives a change in the magnetic flux from the scale coil 22, on an insulating substrate 31 made of glass epoxy resin. The insulating substrate 31 may be configured from a material such as glass or silicon rather than glass epoxy resin.

The transmitting device 4 is provided to face the scale 2, and includes a transmitting coil 41 that generates the magnetic flux in the scale coil 22.

The transmitting coil 41 is formed of a material having a low electric resistance such as aluminum, copper, or gold, and is arranged in a rectangular shape to surround the receiving device 5.

The transmitting coil 41 need not be arranged in a rectangular shape to surround the receiving device 5, and may have any configuration as far as the magnetic flux can be generated in the scale coil 22.

The receiving device 5 is positioned inside the transmitting coil 41, and includes receiving units 51 to 53 including a plurality of receiving coils 500. The receiving unit 51 functions as a first receiving unit, and the receiving unit 52 functions as a second receiving unit. The receiving units 51 to 53 are arranged such that phases of the three units are shifted by 120 degrees from each other.

Here, in a case where any two of the receiving units 51 to 53 are arranged such that phases of the two units are shifted from each other, the receiving device 5 can detect the moving direction (direction of a signal) of the head 3 with respect to the scale 2. In a case where the receiving units 51 to 53 are arranged such that phases of the three units are shifted from each other, the receiving device 5 can extract a signal by two phases from a signal by three phases, and can cancel distortion of a signal generated when the head 3 is moved with respect to the scale 2.

For this reason, in the receiving device 5, to enhance accuracy of a signal to be detected, the three receiving units 51 to 53, the receiving unit 51 as the first receiving unit, the receiving unit 52 as the second receiving unit, and the additional receiving unit 53, are arranged to be shifted from each other along the X direction that is the measurement direction.

The receiving device 5 includes one end portion 10a and another end portion 10b that are respectively positioned at one end side (left direction side of the page) and the other end side (right direction side of the page) in the X direction that is the measurement direction and in which a density of the plurality of receiving coils 500 is made sparse. In addition, the receiving device 5 includes a central portion 11 that is positioned between the one end portion 10a and the other end portion 10b and in which the density of the plurality of receiving coils 500 is made dense.

The one end portion 10a and the other end portion 10b are sparse portions in which the receiving units 51 to 53 are arranged to be shifted from each other and overlapping of the plurality of receiving coils 500 is less than that in the central portion 11, and the plurality of receiving coils 500 is arranged in a substantially triangular shape.

The central portion 11 is a dense portion in which the receiving units 51 to 53 are arranged to be shifted from each other and the overlapping of the plurality of receiving coils 500 is greater than that in the one end portion 10a and the other end portion 10b, and the plurality of receiving coils 500 is arranged in a substantially rectangular shape.

Therefore, the plurality of receiving coils 500 of the receiving device 5 is arranged in an elongated substantially hexagonal shape along the X direction that is a row direction.

Figure 4A:
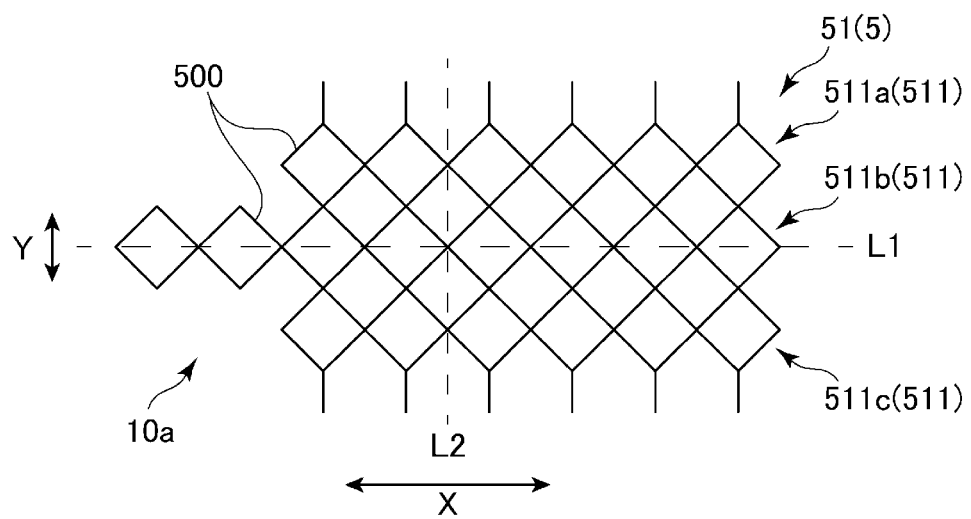
FIGS. 4A to 4C are diagrams each illustrating a receiving unit according to the first embodiment of the present invention.
Figure 4B:
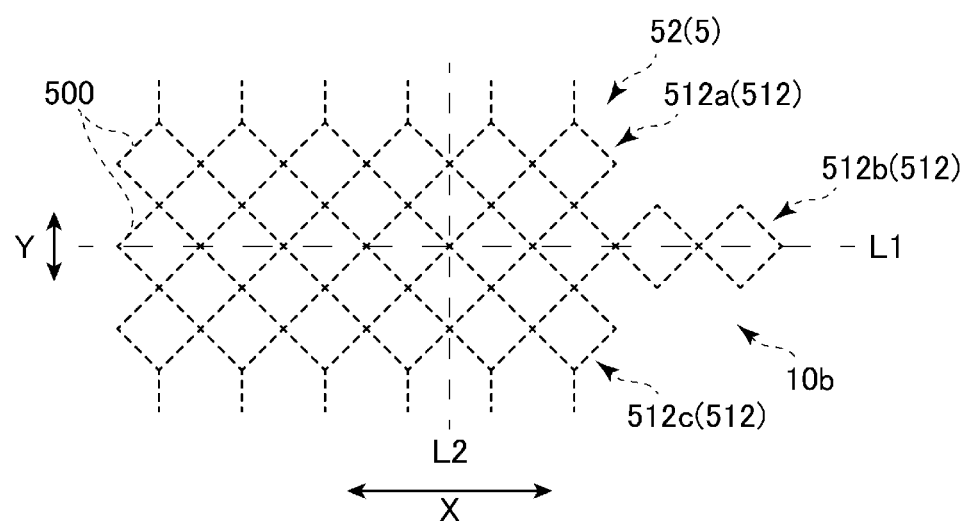
Figure 4C:
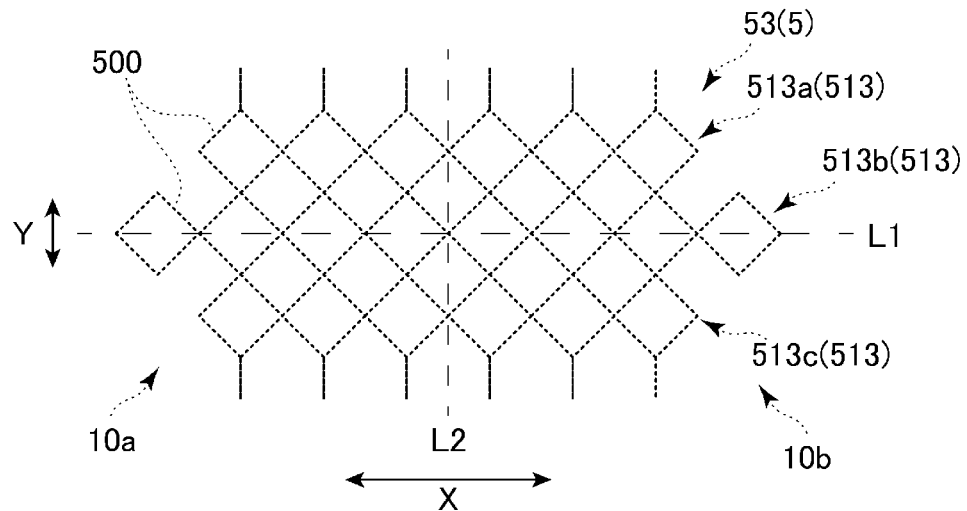

FIGS. 4A to 4C are diagrams each illustrating the receiving unit according to the first embodiment of the present invention.

Specifically, FIG. 4A is a diagram illustrating the receiving unit 51 that is the first receiving unit. FIG. 4B is a diagram illustrating the receiving unit 52 that is the second receiving unit. FIG. 4C is a diagram illustrating the receiving unit 53.

The receiving units 51 to 53 respectively include coil lines 511 to 513 in which the plurality of receiving coils 500 is arranged along the X direction that is the row direction parallel to the measurement direction.

Three rows of each of coil lines 511 to 513 in the receiving units 51 to 53 are arranged in parallel along the Y direction that is the column direction.

As illustrated in FIG. 4A, the receiving unit 51 includes the coil line 511 in which the plurality of receiving coils 500 is arranged along the X direction.

The coil line 511 includes a coil line 511a positioned on the uppermost row (upward direction of the page), a coil line 511b positioned in the middle row, a coil line 511c positioned in the lowermost row (downward direction of the page), and the coil lines are arranged in parallel along the Y direction.

In the one end portion 10a of the receiving unit 51, out of the coil lines 511a and 511c, each two of the receiving coils 500 arranged at both sides in the Y direction are removed in an axisymmetric manner with respect to a symmetry axis L1 along the X direction that is the measurement direction.

As illustrated in FIG. 4B, the receiving unit 52 includes a coil line 512 in which the plurality of receiving coils 500 is arranged along the X direction.

The coil line 512 includes a coil line 512a positioned in the uppermost row, a coil line 512b positioned in the middle row, and a coil line 512c positioned in the lowermost row, and the coil lines are arranged in parallel along the Y direction.

In the other end portion 10b of the receiving unit 52, out of the coil lines 512a and 512c, each two of the receiving coils 500 arranged at both sides in the Y direction are removed in the axisymmetric manner with respect to the symmetry axis L1 along the X direction.

That is, in the receiving unit 52, the receiving coils 500 are arranged at positions in which the receiving unit 51 is inverted to be axisymmetric with respect to a symmetry axis L2 along the Y direction that is the column direction.

As illustrated in FIG. 4C, the receiving unit 53 includes a coil line 513 in which the plurality of receiving coils 500 is arranged along the X direction.

The coil line 513 includes a coil line 513a positioned in the uppermost row, a coil line 513b positioned in the middle row, and a coil line 513c positioned in the lowermost row, and the coil lines are arranged in parallel along the Y direction.

In the one end portion 10a and the other end portion 10b of the receiving unit 53, out of the coil lines 513a and 513c, each one of the receiving coils 500 arranged at both sides in the Y direction that is the column direction is removed in the axisymmetric manner with respect to the symmetry axis L1 along the X direction that is the measurement direction.

That is, in the receiving unit 53, the receiving coils 500 are arranged at positions that are axisymmetric with respect to the symmetry axes L1 and L2 along the X and Y directions, respectively.

Figure 5A:
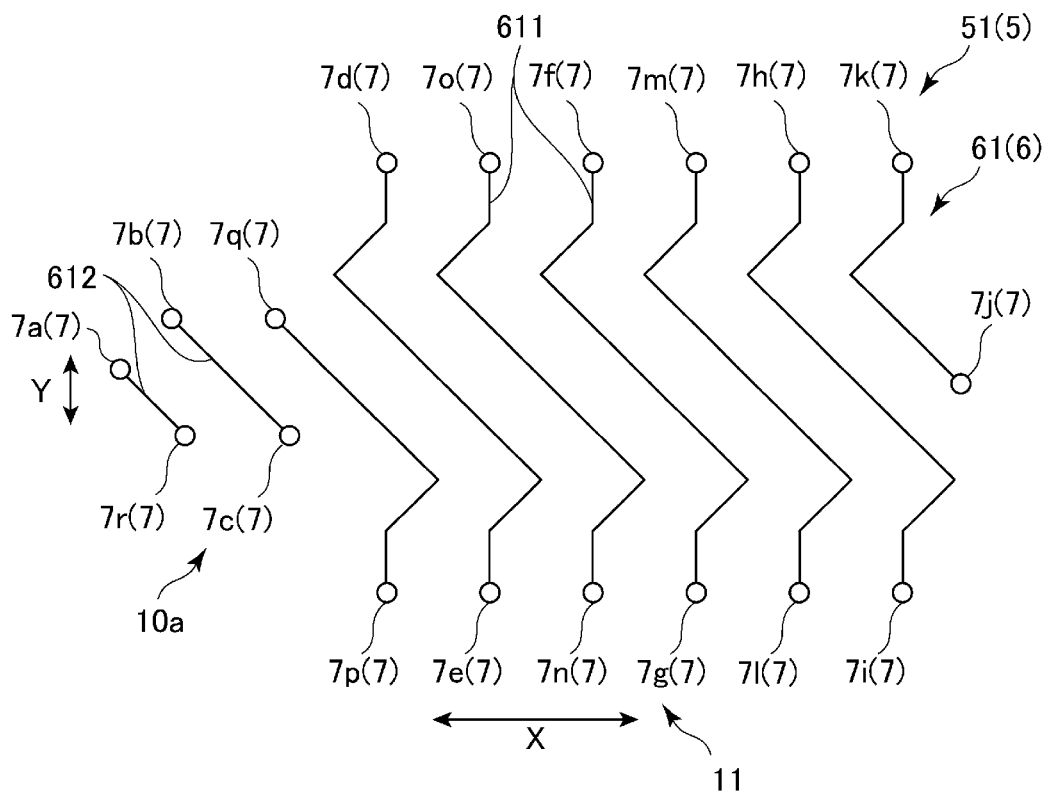
FIGS. 5A and 5B are diagrams each illustrating wiring lines configuring receiving coils according to the first embodiment of the present invention.
Figure 5B:
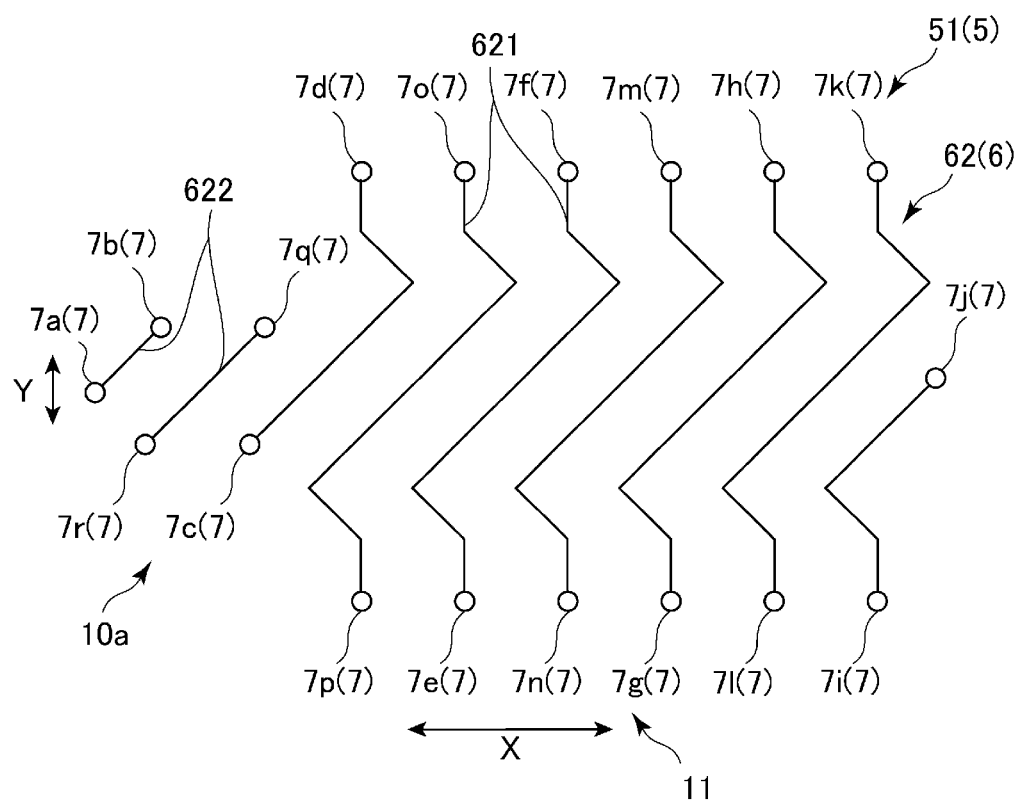

FIGS. 5A and 5B are diagrams each illustrating wiring lines configuring receiving coils according to the first embodiment of the present invention.

Specifically, FIGS. 5A and 5B are diagrams each illustrating a plurality of wiring layers 6 configuring the receiving coils 500 in the receiving unit 51 of FIG. 4A. In addition, the plurality of wiring layers 6 includes a first wiring layer 61 and a second wiring layer 62 each including a plurality of wiring lines arranged. FIG. 5A is a diagram illustrating the first wiring layer 61. FIG. 5B is a diagram illustrating the second wiring layer 62.

The receiving coils 500 are configured by layering the first wiring layer 61 and the second wiring layer 62.

As illustrated in FIG. 5A, the first wiring layer 61 includes substantially S-shaped wiring lines 611 configuring the receiving coils 500 of the central portion 11 that is a dense state portion of the receiving unit 51, and wiring lines 612 configuring the receiving coils 500 of the one end portion 10a that is a sparse state portion of the receiving unit 51, along the X direction that is the measurement direction.

As illustrated in FIG. 5B, the second wiring layer 62 includes substantially inverted S-shaped wiring lines 621 configuring the receiving coils 500 of the central portion 11 that is the dense state portion of the receiving unit 51, and wiring lines 622 configuring the receiving coils 500 of the one end portion 10a that is the sparse state portion of the receiving unit 51, along the X direction that is the measurement direction.

The plurality of wiring layers 6 includes connecting portions 7 configuring the receiving coils 500 by layering and connecting together the first wiring layer 61 and the second wiring layer 62. The connecting portions 7 connect the first wiring layer 61 and the second wiring layer 62 together in one stroke.

Specifically, as illustrated in FIGS. 5A and 5B, the connecting portions 7 include a first connecting portion 7a to an eighteenth connecting portion 7r. The first connecting portion 7a to the third connecting portion 7c, the seventeenth connecting portion 7q, and the eighteenth connecting portion 7r configure the wiring lines 611 and the wiring lines 621 configuring the receiving coils 500 of the one end portion 10a that is the sparse state portion of the receiving unit 51. The fourth connecting portion 7d to the sixteenth connecting portion 7p connect together the wiring lines 611 and the wiring lines 621 configuring the receiving coils 500 of the central portion 11 that is the dense state portion of the receiving unit 51.

The plurality of wiring layers 6 is connected together in one-stroke by the first connecting portion 7a to the eighteenth connecting portion 7r, so that current flows with the first connecting portion 7a as a start point and an end point, for example, and as a whole the wiring layers 6 function as the receiving unit 51 that is one coil.

The start point and the end point of the flow of the current are not limited to the first connecting portion 7a, and any of the connecting portions 7 in the first connecting portion 7a to the eighteenth connecting portion 7r may be the start point and the end point.

The wiring layers 6 of the receiving unit 52 have the same arrangement as an arrangement in which the wiring layers 6 of the receiving unit 51 are inverted to be axisymmetric with respect to the symmetry axis L2.

In addition, the receiving unit 53 (not illustrated) is formed in one stroke by layering the first wiring layer and the second wiring layer and connecting the layers together by the connecting portions 7, similarly to the receiving units 51 and 52.

The connecting portions 7 each are a through hole, a via hole, or the like, and may have any configuration as far as the receiving coils 500 can be configured by connecting the wiring lines 611, 612, 621, and 622.

According to the present embodiment as described above, the following functions and effects can be obtained.

(1) Even if the head 3 rotates in the pitch direction and comes close to or away from the scale 2, the change in the magnetic flux generated is smaller in the one end portion 10a and the other end portion 10b in which the density of the plurality of receiving coils 500 is made sparse than in the central portion 11 in which the density of the plurality of receiving coils 500 is made dense, so that it is possible to make the apparatus less susceptible to the influence of the change in the magnetic flux received by the receiving device 5. In addition, even if the head 3 rotates in the pitch direction and comes close to or away from the scale 2, a magnitude of the magnetic flux generated is larger in the central portion 11 in which the density of the plurality of receiving coils 500 is made dense than in the one end portion 10a and the other end portion 10b in which the density of the plurality of receiving coils 500 is made sparse, so that it is possible to make the apparatus susceptible to the influence of the change in the magnetic flux received by the receiving device 5. As a result, in the electromagnetic induction type displacement detection apparatus 1, the change in the magnetic flux received by the receiving device 5 can be stabilized. Therefore, in the electromagnetic induction type displacement detection apparatus 1, the influence of the change in the magnetic flux received by the receiving device 5 can be suppressed.

(2) The one end portion 10a and the other end portion 10b are each made to have a state in which the density of the plurality of receiving coils 500 is made sparse, by removing some of the receiving coils 500 in at least one coil line out of the plurality of coil lines 511 to 513. For this reason, without layering the wiring layer for canceling the function of the receiving coils 500 or the wiring layer for connecting the two wiring layers 61 and 62 together to increase the number of turns, the receiving coils 500 can be configured by layering the two wiring layers 61 and 62 to have the state in which the density of the plurality of receiving coils 500 is made sparse and the state in which the density is made dense.

(3) Since the receiving coils 500 are formed by layering the two wiring layers 61 and 62, the number of wiring layers used is less than that in a case where the three wiring layers are layered for forming the receiving coils 500. Therefore, a manufacturing process of the receiving coils 500 is simplified, and cost reduction of the electromagnetic induction type displacement detection apparatus 1 can be achieved.

(4) The receiving coils 500 can be made to have the state in which the density of the plurality of receiving coils 500 is made sparse, without arranging the wiring line extending in the outside of the region where the receiving coils 500 that function effectively are formed.

(5) In the receiving coils 500, all wiring lines can be caused to function effectively as the receiving coils 500. Therefore, in the electromagnetic induction type displacement detection apparatus 1, efficiency of the receiving coils 500 can be improved.

(6) In the one end portion 10a and the other end portion 10b, out of the plurality of coil lines 511 to 513, some of the receiving coils 500 of each of the coil lines 511 to 513 arranged at both sides in the column direction are removed in the axisymmetric manner with respect to the symmetry axis L1 along the measurement direction. As a result, in a case where the head 3 rotates in the roll direction with respect to the scale 2, in the one end portion 10a and the other end portion 10b, the number of the plurality of receiving coils 500 close to the scale 2 and the number of the receiving coils 500 away from the scale 2 are the same as each other, so that the influence of the change in the magnetic flux can be canceled and decreased.

(7) The plurality of receiving coils 500 of the receiving device 5 is arranged in a substantially hexagonal shape along the measurement direction. Specifically, portions in a state in which the density of the plurality of receiving coils 500 is made dense are arranged in a substantially rectangular shape. Portions in the state in which the density of the plurality of receiving coils 500 is made sparse are arranged in a substantially triangular shape having each side on the one end portion 10a side and the other end portion 10b side of the substantially rectangular shape as the base. As a result, in a case where the head 3 rotates in the yaw direction with respect to the scale 2, the receiving coils 500 in the one end portion 10a and the other end portion 10b do not easily protrude outside the scale 2, so that the influence of the change in the magnetic flux can be decreased.

(8) The measuring instrument includes the electromagnetic induction type displacement detection apparatus 1 according to the present invention, whereby the influence of the change in the magnetic flux received by the receiving device 5 can be suppressed, and stability of the measurement result can be improved.

Second Embodiment

Hereinafter, a second embodiment of the present invention will be described with reference to the drawings. In the following description, parts already described are denoted by the same reference numerals, and description thereof is omitted.

Figure 6:
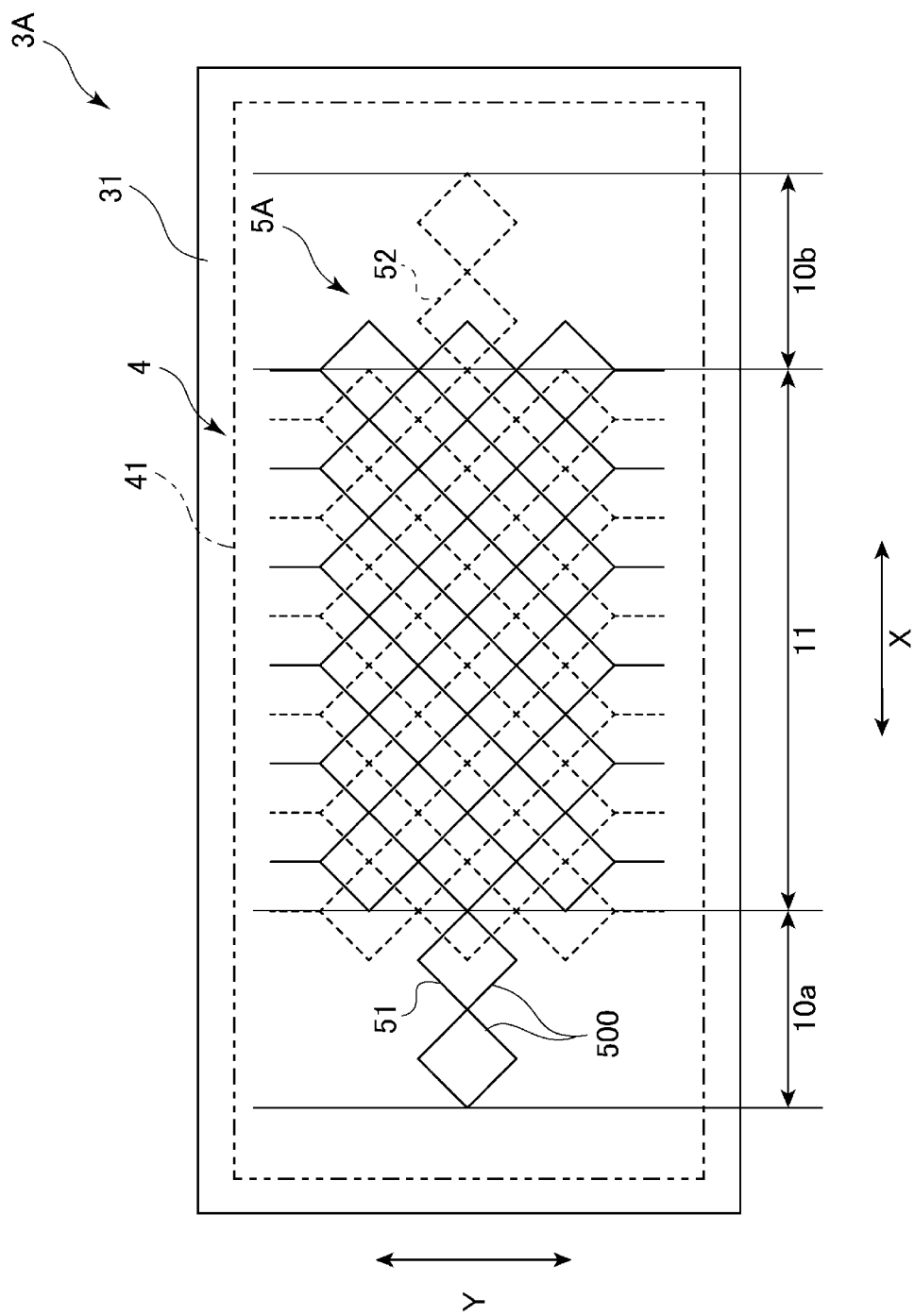
FIG. 6 is a top view illustrating a head according to a second embodiment of the present invention.

FIG. 6 is a top view illustrating the head according to the second embodiment of the present invention.

A head 3A of the present embodiment includes substantially the same configuration as the head 3 of the first embodiment except for a receiving device 5A.

As illustrated in FIG. 3, the receiving device 5 of the first embodiment includes three receiving units 51 to 53, the receiving unit 51 as the first receiving unit, the receiving unit 52 as the second receiving unit, and the additional receiving unit 53, arranged to be shifted from each other along the X direction that is the measurement direction. As illustrated in FIG. 6, the receiving unit 5A of the present embodiment is different from the first embodiment in that the receiving unit 5A includes two receiving units 51 and 52, the receiving unit 51 as the first receiving unit and the receiving unit 52 as the second receiving unit, arranged to be shifted from each other along the X direction that is the measurement direction.

The receiving device 5A can detect a moving direction (direction of a signal) of the head 3 with respect to the scale 2, by arranging the two receiving units 51 and 52 such that phases of the two units are shifted from each other.

Also in the present embodiment as described above, the functions and effects similar to (1) to (8) in the first embodiment can be obtained, and besides, the following function and effect can be obtained.

(9) In the receiving device 5A, the two receiving units 51 and 52, the receiving unit 51 as the first receiving unit and the receiving unit 52 as the second receiving unit, are arranged to be shifted from each other along the X direction, so that the number of receiving units used is less than that in a case where the three receiving units 51 to 53 are arranged to be shifted from each other along the X direction. Therefore, a manufacturing process of the receiving device 5A is simplified, and cost reduction can be achieved.

Modification of Embodiment

The present invention is not limited to the embodiments described above, and modifications and improvements within the scope of achieving the object of the present invention are included in the present invention.

For example, in the embodiments described above, the electromagnetic induction type displacement detection apparatus 1 is used as an electromagnetic induction type caliper as a measuring instrument; however, the apparatus may be used for other measuring instruments such as a dial gauge (test indicator) and a micrometer. That is, the electromagnetic induction type displacement detection apparatus 1 is not particularly limited in the type and method of the measuring instrument to be used, and can be used in other measuring instruments and the like, and an instrument is not particularly limited into which the electromagnetic induction type displacement detection apparatus of the present invention is implemented.

In addition, the electromagnetic induction type displacement detection apparatus 1 may be used for a device other than a measuring instrument such as a sensor.

In the first embodiment, the receiving unit 51 functions as the first receiving unit and the receiving unit 52 functions as the second receiving unit; however, the receiving unit 53 may be the first receiving unit, or the receiving unit 51 may be the second receiving unit. That is, for the first receiving unit and the second receiving unit, it is sufficient that any of the receiving units 51 to 53 function as the first receiving unit and the second receiving unit.

Figure 7:
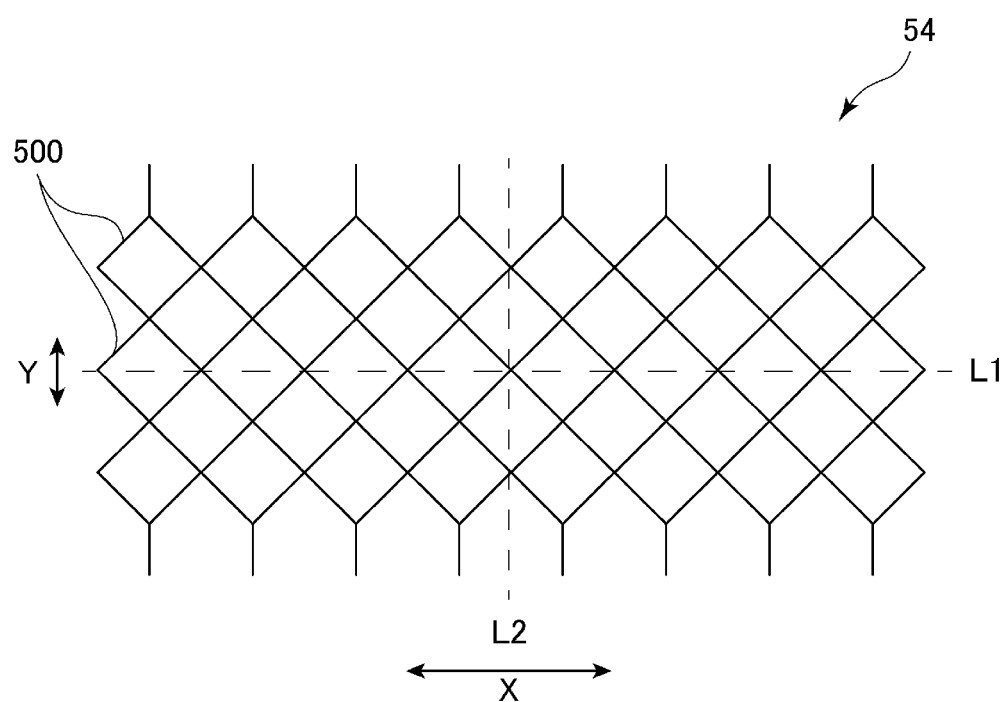
FIG. 7 is a diagram illustrating a receiving unit according to a modification.

FIG. 7 is a diagram illustrating a receiving unit according to a modification.

As illustrated in FIG. 7, a receiving unit 54 is configured such that the receiving coils 500 are not removed.

In the embodiments described above, the receiving units 51 to 53 are arranged to be shifted from each other along the X direction that is the measurement direction; however, receiving units having arrangements of the receiving coils 500 different from the arrangements of the receiving coils 500 of the receiving units 51 to 53 may be arranged to be shifted from each other. In addition, the receiving unit 54 configured such that the receiving coils 500 are not removed, and the receiving units 51 to 53 may be combined and arranged to be shifted from each other along the X direction that is the measurement direction. That is, it is sufficient that it is possible to configure the state in which the density of the plurality of receiving coils 500 is made sparse and the state in which the density is made dense, by arranging a plurality of receiving units to be shifted from each other in the X direction.

In the embodiments described above, the one end portion 10a and the other end portion 10b are configured to be axisymmetric with respect to both the X direction that is the measurement direction and the Y direction that is the direction orthogonal to the measurement direction as the symmetry axes; however, the one end portion 10a and the other end portion 10b may be asymmetric. That is, it is sufficient that the one end portion 10a and the other end portion 10b can configure a state in which the density of the plurality of receiving coils 500 is made sparser than that of the central portion 11.

In the embodiments described above, in the one end portion 10a and the other end portion 10b, the density of the plurality of receiving coils 500 is made sparse by removing an identical number of receiving coils 500; however, in the one end portion 10a and the other end portion 10b, the density of the plurality of receiving coils 500 may be made sparse by removing different numbers of receiving coils 500 respectively. That is, it is sufficient that, in the one end portion 10a and the other end portion 10b, the density of the plurality of receiving coils 500 can be made sparse by removing the receiving coils 500.

INDUSTRIAL APPLICABILITY

As described above, the present invention can be suitably used for an electromagnetic induction type displacement detection apparatus that uses an induced current to detect an amount of movement between members.

What is claimed is:

1. An electromagnetic induction type displacement detection apparatus comprising: a scale including a scale coil; and a head facing the scale and relatively moving along the scale in a measurement direction, wherein
the head includes:
a transmitting device including a transmitting coil that generates magnetic flux in the scale coil; and
a receiving device that includes a first receiving unit and a second receiving unit each receiving a change in magnetic flux from the scale coil and in which the first receiving unit and the second receiving unit are arranged to be shifted from each other along the measurement direction, the first receiving unit and the second receiving unit include a plurality of coil lines arranged in parallel along a column direction, the plurality of coil lines including a plurality of receiving coils arranged along a row direction parallel to the measurement direction, the receiving device includes:

one end portion and another end portion that are positioned at one end side and another end side in the measurement direction respectively and in which a density of the plurality of receiving coils is made sparse; and a central portion that is positioned between the one end portion and the other end portion and in which the density of the plurality of receiving coils is made dense, the first receiving unit and the second receiving unit include three or more rows of coil lines, and in the one end portion and the other end portion, the density of the plurality of receiving coils is made sparse, by removing some of the receiving coils of each of the coil lines arranged at both sides in the column direction, out of the plurality of coil lines, in an axisymmetric manner with respect to a symmetry axis along the measurement direction.

2. The electromagnetic induction type displacement detection apparatus according to claim 1, wherein in the one end portion and the other end portion, the density of the plurality of receiving coils is made sparse by removing an identical number of receiving coils.

3. A measuring instrument comprising an electromagnetic induction type displacement detection apparatus according to claim 1, wherein a measurement result is output on the basis of an amount of movement between a scale and a head detected by the electromagnetic induction type displacement detection apparatus.

* * * * *